United States Patent [19]

Palmer et al.

[11] Patent Number: 4,520,650
[45] Date of Patent: Jun. 4, 1985

[54] FIELD-PORTABLE CALIBRATION UNIT FOR ELECTROMAGNETIC FLOW METERS

[75] Inventors: David A. Palmer; James K. Palmer, both of San Luis Obispo, Calif.

[73] Assignee: Montedoro-Whitney Corporation, San Luis Obispo, Calif.

[21] Appl. No.: 536,749

[22] Filed: Sep. 28, 1983

[51] Int. Cl.³ .............................................. G01F 25/00
[52] U.S. Cl. ........................................ 73/3; 73/861.12
[58] Field of Search ...................... 73/3, 861.12, 861.16

[56] References Cited

U.S. PATENT DOCUMENTS

| | | | |
|---|---|---|---|
| 2,757,538 | 8/1956 | Soffel | 73/861.16 |
| 3,633,401 | 1/1972 | Wada | 73/3 |
| 4,417,479 | 11/1983 | Schmoock | 73/861.16 |

Primary Examiner—Herbert Goldstein
Attorney, Agent, or Firm—Daniel C. McKown

[57] ABSTRACT

A calibrator especially suitable for calibrating electromagnetic flow velocity sensors under field conditions requires no source of water and no source of electrical power. The calibrator includes a pickup coil that intercepts all or a known fraction of the flux generated by the sensor and generates a voltage in response to the flux. The voltage is applied to the electrodes of the sensor thereby simulating a flow velocity. The gain of the sensor is adjusted so that the simulated flow velocity equals a pre-determined reading. The pickup coil may include a number of taps that may selectively be connected to an electrode of the sensor to simulate flow velocities of various magnitudes, thereby permitting the linearity of the sensor to be checked. The calibrator also includes a direct conductive path that may selectively be connected between the electrodes of the sensor to simulate the zero flow velocity condition, thereby permitting the zero offset of the sensor to be checked.

12 Claims, 10 Drawing Figures

FIG.5
(Prior Art)
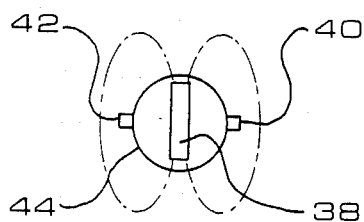
FIG.6
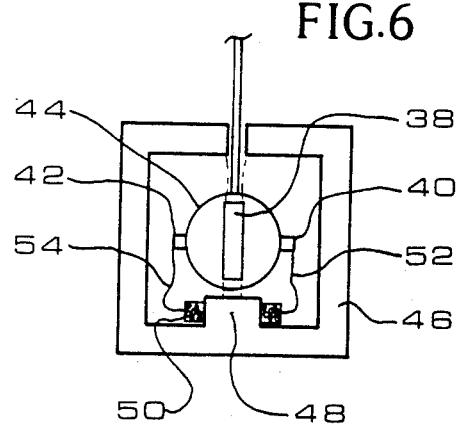
FIG.7
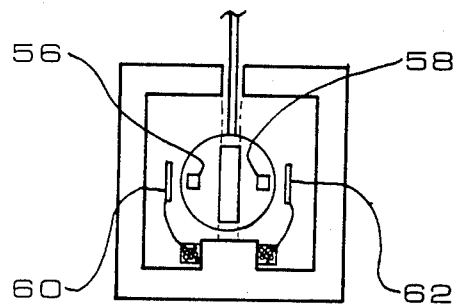
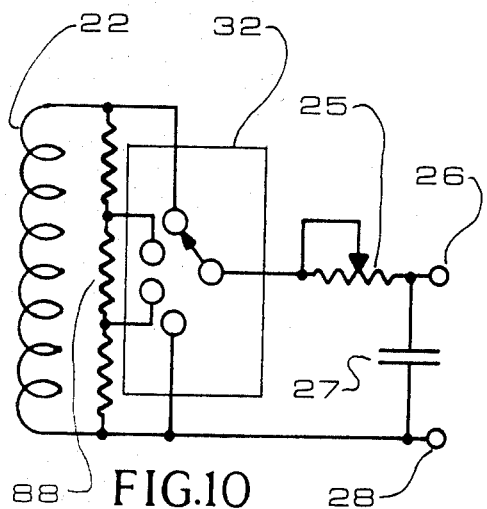
FIG.10
FIG.8
(Prior Art)
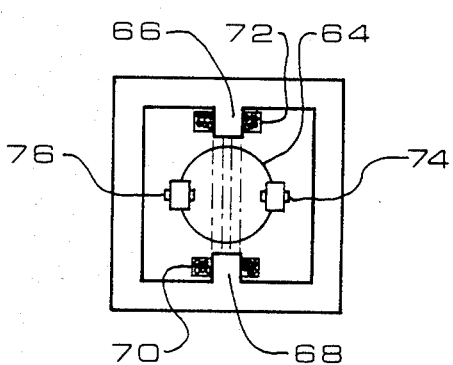
FIG.9
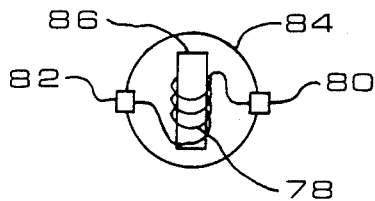

FIELD-PORTABLE CALIBRATION UNIT FOR ELECTROMAGNETIC FLOW METERS

BACKGROUND OF THE INVENTION

1. Field of the Invention

The present invention is in the field of electrical instruments and more specifically relates to a calibrator for calibrating flow meters of the electromagnetic type. The calibrator is noteworthy in that it permits the calibration to be done in the field and without the use of a power supply or a supply of water.

2. The Prior Art

The type of flow meter which the present invention calibrates is exemplified by the flow meter described in U.S. Pat. No. 4,389,898 issued June 28, 1983 to Long, et al.

FIG. 1 herein is derived from FIG. 4a of the Long, et al. patent and shows in diagrammatic form a side view of a typical electromagnetic flow meter. As shown in FIG. 1, the flow meter includes two U-shaped magnets 2, 4, and a common energizing coil 6 that is connected to a source of alternating or repetitive current. The coil 6 magnetizes the magnet cores establishing a fluctuating magnetic field indicated by the lines of flux 12. The sensor also includes the electrodes 8, 10 which are electrically isolated from the coil. In the space between the electrodes 8, 10 the magnetic field is directed predominantly in the direction indicated by the arrow, that is, perpendicular to a line joining the electrodes. The fluid, which could be water or some other liquid or a gas, flows perpendicular to the page, that is, perpendicular to both the magnetic field and the line joining the electrodes 8, 10. Under these conditions and in accordance with Faraday's principle, an electromotive force is developed between the electrodes 8, 10, and the magnitude of this emf is proportional to the flow velocity. Thus, the flow velocity is measured by measuring the voltage across the electrodes 8, 10. Clearly, if an alternating current is applied to the coil 6, this voltage also will be an alternating voltage and its amplitude will be proportional to the flow rate.

There are three main sources of error of such an instrument. First, there may be a zero offset by which is meant the sensor reads a non-zero velocity when placed in still water. Typically, zero offset is checked by placing the sensor in a bucket of water and taking a reading after the water has come to rest.

A second type of error is a deviation of the magnetic drive level from its desired value. Typically, this is caused when the circuit that drives the coil 6 of FIG. 1 does not provide a constant output. As a result, the strength of the magnetic field may deviate from its proper value. Normally, this is checked by measuring the output of the drive circuit. This measurement is complicated by the magnetic field produced by the coil, assuming the measurement is made with the coil connected to the drive circuit.

A third type of error is caused by fluctuation in the gain of the amplifier used in measuring the potential difference between the electrodes 8, 10. Normally, the gain of the amplifier is adjusted to compensate for variations in all of the other factors in order to bring the sensor into calibration. Typically, at the factory or special test facility, the sensor is placed in a stream of water that is moving at a precisely determined velocity, and with the sensor in the stream, the gain of the amplifier is adjusted until the instrument reads the known velocity. The technique, of course, is not usable in the field, because of the lack of a stream of known velocity.

In a typical sensor, the coil 6 is energized with a 15 Hz signal. Such an instrument is capable of measuring flow velocities as small as 0.05 feet per second with a repeatability of 0.01 feet per second.

Thus, it is seen that the conventional mode of measuring zero offset requires a bucket of still water, while the conventional way of calibrating the sensor at higher flow velocities requires a special test facility in which the velocity of the liquid can be maintained at a constant known velocity. Accordingly, no practical method is known for calibrating electromagnetic flow meters known under field conditions, and it is this need that the present invention is intended to fill.

SUMMARY OF THE INVENTION

The present invention fills the need for a calibrator that can be used under field conditions. The calibrator of the present invention does not require the use of a bucket of still water, nor does it require a stream of known velocity. Further, the calibrator of the present invention does not even require a source of electrical power.

In accordance with the preferred embodiment of the present invention, a pickup coil encircles substantially all of the lines of flux thereby causing an emf to be induced in the pickup coil. This induced voltage is coupled to the electrodes by means of an integration or phase shifting network such as a series resistor and a shunt capacitor. This simple network will cause any change in the induced emf from the pickup coil to be delayed long enough for the electronic amplifier in the velocity meter to detect the signal and cause it to be registered as a synthetic velocity reading.

A variable resistor in the delay network of this calibrator can be used to precisely adjust the signal voltage coupled to the electrodes so an exact number for flow velocity can be simulated.

Once this calibrator has been set to simulate a value of flow velocity with a particular flow meter, the gain control for that flow meter can be adjusted until its reading equals the predetermined value.

In an alternative embodiment of the invention, a known fraction of the magnetic flux is intercepted by the pickup coil. In general this embodiment requires greater accuracy in the positioning of the sensor within the calibrator.

Also in accordance with a preferred embodiment of the present invention, the pickup coil is provided with one or more precisely determined taps, so that precisely determined fraction of the total induced emf can selectively be applied by the user to the electrodes of the flow meter. This permits the linearity of the sensor to be tested; i.e., this permits calibration of the sensor at selected (simulated) flow velocities.

In accordance with the preferred embodiment of the present invention, the zero offset error can be determined by selectively providing a direct conductive path (short circuit) between the electrodes 8, 10.

In accordance with the present invention, there is provided a method for calibrating an electromagnetic flow sensor that involves the steps of activating the sensor while it is removed from the flow and while it is engaged with the calibrator; intercepting a known percentage of the lines of flux produced by the sensor and converting the intercepted flux to a voltage; applying the potential difference to the electrodes of the sensor;

and, adjusting the sensor so that its reading equals a pre-established value.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 5 is a diagram showing a sensor of a type known in the prior art and different from the sensor shown in FIG. 1;

FIG. 6 is a diagram showing how an alternative embodiment of the present invention can be engaged to the sensor of FIG. 5 for the purpose of calibrating that sensor;

FIG. 7 is a diagram showing another embodiment of the present invention as used to calibrate a sensor in which the picked up signals are capacitively coupled to the electrodes of the sensor;

FIG. 8 is a diagram illustrating a type of flow meter known in the art and intended for use in measuring the flow velocity of a liquid in a pipe;

FIG. 9 is a diagram showing an embodiment of the present invention that can be inserted into a pipe for calibrating the sensor shown in FIG. 8; and, FIG. 10 is an electrical schematic diagram showing a circuit used in an alternative embodiment of the present invention.

DETAILED DESCRIPTION OF THE PREFERRED EMBODIMENT

Figure 1:
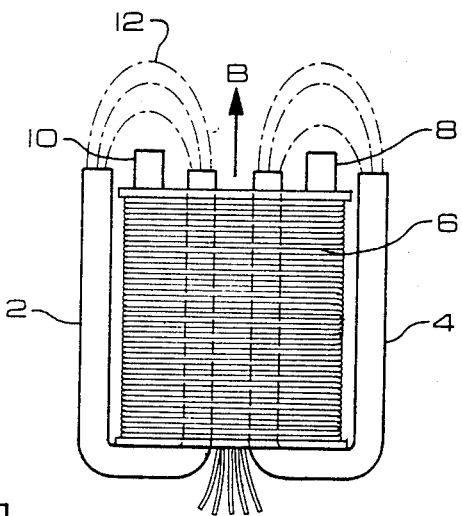
FIG. 1 is a diagram showing a side view of an electromagnetic flow meter of a type known in the prior art and which exemplifies the type of sensor that the calibrator of the present invention can be used to calibrate.
Figure 3:
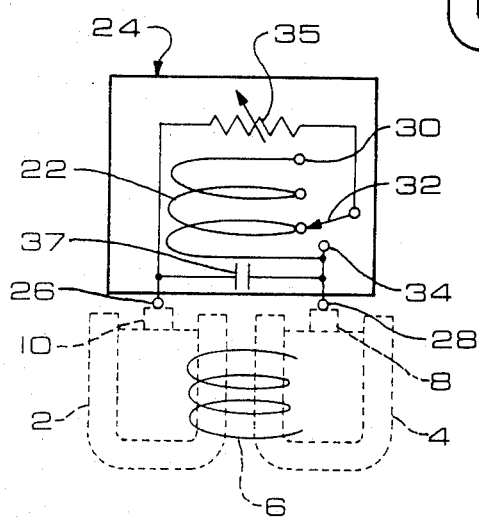
FIG. 3 is a diagram, partly electrical and partly mechanical that illustrates how the pickup coil of the preferred embodiment of the present invention is tapped and connected to the electrodes of the sensor.
Figure 2:
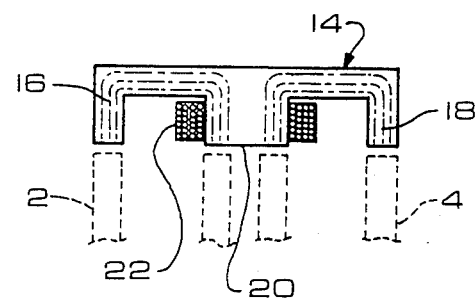
FIG. 2 is a diagram consisting of a side cross-sectional view of a magnetic coupling plate that is a part of the preferred embodiment of the present invention.
Figure 4:
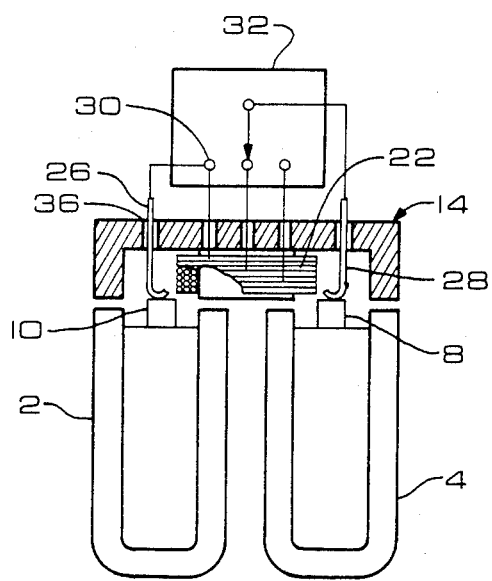
FIG. 4 is a diagram that shows the calibrator of the present invention engaged to the sensor of FIG. 1.

FIG. 1 shows a typical electromagnetic flow meter of a type known in the prior art. FIGS. 2, 3 and 4 illustrate a preferred embodiment of the invention and the manner in which it is engaged to the flow meter of FIG. 1. FIGS. 6, 7 and 9 show alternative embodiments of the present invention that are adapted for calibrating other forms of electromagnetic flow meters.

In. the preferred embodiment of the present invention, a magnetic coupling plate 14 shown in FIG. 2 is used to intercept substantially all of the flux developed by the U-shaped magnetic cores 2, 4 of FIG. 1, Substantially all of the lines of flux flow through the central pole piece 20 from whence they are returned to complete the magnetic circuit through the pole pieces 16, 18. In accordance with the preferred embodiment of the invention, the pickup coil 22 encircles the central pole piece 20 and hence substantially all of the flux lines loop through the pickup coil 22. As is well known, a fluctuating signal in the coil 6 of FIG. 1 causes the flux through the pickup coil 22 to fluctuate, thereby inducing an emf in the pickup coil 22. When the sensor is engaged to the calibrator, the coil 6 and the pickup coil 22 constitute the primary and secondary windings of a transformer.

FIG. 3 shows in diagrammatic form the electrical connections by which the calibrator 24 of the present invention is connected to the sensor of FIG. 1. The calibrator 24 includes the pickup coil 22, the contacts 26, 28, the taps 30 of the pickup coil 22, the selector switch 32, the shorting contact 34, the variable resistor 35, and the capacitor 37.

The variable resistor 35 permits the signal voltage coupled to the electrodes 8, 10 to be adjusted so that a round number for flow velocity can be simulated.

The contacts 26, 28 are specifically adapted to engage the electrodes 8, 10 in a manner that minimizes the contact resistance. Also, the contacts 26, 28 are gold plated to reduce the contact resistance.

The pickup coil 22 is tapped at precisely determined locations to permit precisely determined fractions of the induced emf to be selectively picked off by the selector switch 32 which the user operates. The shorting contact 34 permits the user to establish a direct conductive path between the electrodes 8, 10. The taps 30 on the pickup coil 22 permit the user to apply precisely determined fractions of the total emf developed in the pickup coil 22 to the electrodes 8, 10 so as to simulate flow velocities of various magnitudes. This is useful in checking the linearity of the instrument, i.e., its ability to produce accurate readings of flow velocities of various magnitudes.

Together the resistor 35 and the capacitor 37 constitute an RC coupling network through which the induced emf is coupled to the electrodes. The RC network causes changes in the induced emf from the pickup coil 22 to be delayed long enough for the electronic amplifier in the flow velocity meter to detect the signal and to cause the signal to be registered as a synthetic velocity FIG. 4 shows the physical arrangement of the components in a simplified version of the preferred embodiment, in diagrammatic form. The leads from the taps of the pickoff coil 22 as well as the leads from the contacts 26, 28 are threaded through the magnetic coupling plate 14 to the selector switch 32 which is mounted on the opposite side of the coupling plate from the pickup coil 22. It is seen that the calibrator is smaller than the sensor and requires neither water nor external electric power.

FIG. 5 shows in diagrammatic form another embodiment of an electromagnetic flow meter known in the art. In the embodiment of FIG. 5, unlike the embodiment of FIG. 1, a single bar-shaped magnet 38 is employed, and it is enclosed in a spherical housing 44. The electrodes 40, 42 are located at diametrically opposed locations on the equator of the spherical housing 44.

FIG. 6 shows in diagrammatic form the physical layout of an alternative embodiment of the present invention suitable for use with an electromagnetic flow meter of the type shown in FIG. 5. As indicated in FIG. 6, the magnetic flux is captured by a pole piece 48 and is returned to the other end of the magnet by means of the magnetic coupling plate 46. The pickup coil 50 encircles the lines of flux as they pass through the pole piece 48. As the current in the bar-shaped magnet 38 fluctuates, an emf is generated in the pickup coil 50, and this emf is applied through the leads 52, 54 to the electrodes 40, 42 respectively of the sensor. If desired, the pickup coil 50 may be provided with a number of taps comparable to those of the pickup coil 22 of FIGS. 3 and 4.

FIG. 7 shows yet another embodiment of the present invention which is intended for operation with a sensor that differs from the sensor of FIG. 5 in that the electrodes 56, 58 are not exposed and accordingly, the calibrator is provided with capacitive coupling plates 60, 62 for coupling the emf developed in the pickup coil into the electrodes 56, 58.

FIG. 8 shows yet another type of electromagnetic flow meter known in the prior art. FIG. 8 shows only the flow meter, while FIG. 9 shows a calibrator designed in accordance with the present invention for use with the sensor shown in FIG. 8.

In the sensor of FIG. 8, a magnetic flux is established by the pole pieces 66, 68 through the pipe 64 that contains a fluid that flows in a direction perpendicular to the plane of the drawing. The magnetic field is produced by the activating coils 70, 72 through which a fluctuating electric current is caused to flow. A voltage is developed between the electrodes 74, 76 and the magnitude of the voltage is proportional to the flow velocity.

FIG. 9 shows an alternative embodiment of the present invention usable for calibrating the sensor shown in FIG. 8. The calibrator of FIG. 9 has the shape of a cylindrical plug 84 that is inserted into the pipe 64. The cylindrical plug 84 may be formed of plastic or some other suitable material, and includes the pickup coil 78 and and a ferromagnetic core 86. The signal induced in the pickup coil 78 by the fluctuating magnetic field of the sensor causes a voltage differnece to arise at the contacts 80, 82 which make electrical contact with the electrodes 74, 76 respectively when the calibrator of FIG. 9 is engaged with the sensor of FIG. 8.

FIG. 10 shows the circuit for an alternative embodiment in which, instead of using a tapped coil as in FIG. 3, the entire coil 22 is used in association with a tapped chain 88 of precision resistors. The capacitor 27 and the resistor 25 are comparable to the capacitor 37 and the resistor 35 of FIG. 3.

Thus, there has been described a calibrator for use with electromagnetic flow meters and that is particularly well adapted for making calibrations under field conditions because the calibrator requires no source of electrical power and requires no source of water or other liquid. The structure of the calibrator is extremely simple and its main parts are a pickup coil that may be tapped at various points and a set of contacts for applying the picked up signal to the electrodes of the electromagnetic sensor. From the above description it will be clear that a method for calibrating an electromagnetic sensor has also been described, and that method includes the steps of activating the sensor while it is engaged with the calibrator, intercepting a precisely known fraction of the flux generated by the sensor through the use of a pickup coil in the calibrator and applying the potential difference induced in the pickup coil to the electrodes of the sensor, and then adjusting the sensor to render the reading of the sensor equal to a pre-established value.

The foregoing detailed description is illustrative of one embodiment of the invention, and it is to be understood that additional embodiments thereof will be obvious to those skilled in the art. The embodiments described herein together with those additional embodiments are considered to be within the scope of the invention.

What is claimed is:

1. A field-portable calibrator for calibrating an electromagnetic flow velocity sensor of the type that uses a coil to generate a time-varying magnetic field whose lines of flux extend perpendicular to the direction of flow and that includes electrodes spaced apart in a direction that is perpendicular to both the direction of flow and the direction of the lines of flux, said field-portable calibrator characterized in that it simultaneously checks for accuracy both the strength of the time-varying magnetic field generated by the sensor and the determination made by the sensor of the flow velocity, and further characterized in that it requires neither water nor a source of electrical power, said field-portable calibrator comprising in combination:
   pickup means for intercepting a precisely known percentage of the lines of flux when the sensor is engaged with the calibrator during calibration and for responding to the time-varying magnetic field by producing an electrical signal that bears a known constant relationship to the time-varying magnetic field; and,
   feedback means connected to said pickup means for applying said electrical signal to the electrodes of the sensor.

2. The field-portable calibrator of claim 1 wherein said pickup means further comprise a pickup coil so located as to intercept substantially all of the lines of flux generated by the coil of the sensor 3. The field-portable calibrator of claim 2 further characterized in that it can be used for checking the linearity of the sensor, wherein said pickup coil further comprises a tap.

4. The field-portable calibrator of claim 3 wherein said feedback means further comprise selector means for selectively applying under control of a user a time-varying signal obtained from the tap to the electrodes of the sensor.

5. The field-portable calibrator of claim 1 wherein said feedback means further comprise contacts positioned to make electrical contact with the electrodes of the sensor when the sensor is engaged with the calibrator.

6. The field-portable calibrator of claim 5 wherein said contacts are composed of a material that has a low contact resistance.

7. The field-portable calibrator of claim 1 wherein said feedback means further comprise plates for capacitively coupling said time-varying signal to the electrodes of the sensor.

8. The field-portable calibrator of claim 1 further characterized in that it can determine the zero offset of the sensor, and further comprising in combination:
   shorting means in which no electrical signal is induced by the time-varying magnetic field; and,
   means for electrically connecting said shorting means between the electrodes of the sensor.

9. The field-portable calibrator of claim 1 wherein said precisely known percentage is substantially equal to 100%.

10. A method for calibrating an electromagnetic flow velocity sensor of the type used for reading the velocity of flow of a fluid and that uses a coil to generate a time-varying magnetic field whose lines of flux extend perpendicular to the direction of flow and that includes electrodes spaced apart in a direction that is perpendicular to both the direction of flow and the direction of the lines of flux, said method characterized in that it is particularly well suited for field use because it requires neither water nor a source of electrical power and characterized in that it simultaneously provides a check for accuracy of both the strength of the time-varying magnetic field generated by the sensor and the determination made by the sensor of the flow velocity, said method comprising the steps of:

(a) activating the sensor while it is removed from the fluid and while it is engaged with a calibrator;

(b) intercepting a precisely known percentage of the lines of flux through the use of a pickup coil in the calibrator, whereby a time-varying potential difference having a known constant relationship to the time varying flux is induced between the terminals of the pickup coil in the calibrator;

(c) applying the time-varying potential difference to the electrodes of the sensor; and, (d) adjusting the sensor to render the reading of the sensor equal to a pre-established value.

11. The method of claim 10 wherein the pickup coil is tapped and further characterized in that the linearity of the response of the sensor is checked, said method comprising the further steps of:

selecting a tap of the pickup coil, whereby a reduced time-varying potential difference is induced whose magnitude is a known fraction of the potential difference induced in the entire coil;

applying the reduced time-varying potential difference to the electrodes of the sensor; and, comparing the reading of the sensor when the reduced potential difference is used with a value equal to the known fraction times the pre-established value.

12. The method of claim 10 wherein the calibrator is provided with means for selectively providing a short circuit between the electrodes of the sensor, and further characterized in that the sensor can be checked for zero offset, said method comprising the further steps of:

providing a short circuit between the electrodes of the sensor; and, reading the sensor, whereby any non-zero reading obtained is the zero offset.

* * * * *